(12) United States Patent
Brown et al.

(10) Patent No.: US 8,021,477 B2
(45) Date of Patent: Sep. 20, 2011

(54) METHODS OF LIMITING HYDROXYL ION CONCENTRATIONS OR THEIR EFFECTS IN CONCRETE PORE SOLUTIONS TO INTERFERE WITH ALKALI SILICA REACTION

(76) Inventors: Paul W. Brown, State College, PA (US); Wendy E. Brown, State College, PA (US)

( * ) Notice: Subject to any disclaimer, the term of this patent is extended or adjusted under 35 U.S.C. 154(b) by 1004 days.

(21) Appl. No.: 11/671,765

(22) Filed: Feb. 6, 2007

(65) Prior Publication Data

US 2007/0186821 A1 Aug. 16, 2007

Related U.S. Application Data

(63) Continuation-in-part of application No. 10/972,518, filed on Oct. 25, 2004, now abandoned, which is a continuation-in-part of application No. 10/927,733, filed on Aug. 27, 2004.

(51) Int. Cl.
*C04B 111/20* (2006.01)
*C04B 111/26* (2006.01)
(52) U.S. Cl. ......... 106/713; 106/724; 106/728; 106/823
(58) Field of Classification Search .................. 106/724, 106/728, 823, 713
See application file for complete search history.

(56) References Cited

U.S. PATENT DOCUMENTS

| | | | |
|---|---|---|---|
| 2,848,340 A | 8/1958 | Haldas | |
| 3,188,221 A | 6/1965 | Matsuda et al. | |
| 3,190,762 A | 6/1965 | Carlson et al. | |
| 3,210,207 A * | 10/1965 | Dodson et al. | 106/728 |
| 3,689,295 A * | 9/1972 | Hersey et al. | 106/727 |
| 3,801,338 A * | 4/1974 | Whitaker | 106/728 |
| 4,089,695 A | 5/1978 | Ray | |
| 4,205,993 A * | 6/1980 | Rosenberg et al. | 106/726 |
| 4,444,672 A * | 4/1984 | Gancy | 252/70 |
| 4,502,887 A * | 3/1985 | Tsuda | 524/8 |
| 4,548,270 A | 10/1985 | Eilers | |
| 5,441,760 A * | 8/1995 | Pattengill et al. | 427/138 |
| 5,591,375 A * | 1/1997 | Lott et al. | 252/70 |
| 5,730,895 A * | 3/1998 | Moore | 252/70 |
| 5,750,276 A | 5/1998 | Page | |
| 5,755,876 A | 5/1998 | Stokes et al. | |
| 5,849,356 A * | 12/1998 | Gambino et al. | 427/136 |
| 6,022,408 A | 2/2000 | Stokes et al. | |
| 6,126,850 A * | 10/2000 | Ishioka et al. | 252/70 |
| 6,416,684 B1 * | 7/2002 | Bloomer | 252/70 |
| 6,858,074 B2 * | 2/2005 | Anderson et al. | 106/724 |
| 6,861,009 B1 * | 3/2005 | Leist | 252/70 |
| 7,410,538 B2 * | 8/2008 | Butler et al. | 106/806 |
| 2002/0178971 A1 * | 12/2002 | Castro et al. | 106/706 |
| 2003/0188669 A1 * | 10/2003 | Sobolev et al. | 106/737 |
| 2005/0098062 A1 * | 5/2005 | Butler et al. | 106/2 |
| 2006/0042518 A1 | 3/2006 | Brown et al. | |
| 2006/0254469 A1 | 11/2006 | Hirata et al. | |
| 2007/0125273 A1 * | 6/2007 | Pinto | 106/638 |
| 2007/0169671 A1 * | 7/2007 | Johnston | 106/810 |
| 2008/0202388 A1 * | 8/2008 | Raynaud et al. | 106/695 |

FOREIGN PATENT DOCUMENTS

| | | |
|---|---|---|
| JP | 2002-326854 | 11/2002 |
| WO | WO 93/12052 | 6/1993 |
| WO | WO 2006/026562 | 3/2006 |

OTHER PUBLICATIONS

JP 356093777 A (Koike et al.) Jul. 29, 1981 abstract only.*
ES 2036483 A1 (Trivino Vazquez et al.) May 16, 1993, abstract only.*
RO 55136 (Mihail et al.) Mar. 20, 1973, abstract only.*
Buerge et al., Answer 5 of 5 (Chemical Abstract), EP 465991, Jan. 15, 1992.
Harada et al., Answer 65 of 80 (Chemical Abstract), JP 48066618, Sep. 12, 1973.
Zdaniewica, Answer 19 of 29 of HCAPLUS, "Effect of Admixtures of Organosilicon Compounds on Properties of Cement Pastes and Mortars," Cement-Wapno-Beton, pp. 194-203, 5(5), 2000.
Ogrel et al., Answer 11 of 29 of HCAPLUS, RU 22253777 (Abstract Only), Mar. 10, 2004.
Moropoulou et al., "Answer 12 of 19 of CA on STN,"Accelerate Microstructural Evolution of a Calcium Silicate Hydrate CSH Phase in Pozzolanic Pastes Using Fine Siliceous Sources, Cement and Concrete Research, pp. 1-6, 34(1), 2004.
Ivanov et al:, Answer 53 of 60 WPIX, SU 718407, Feb. 28, 1980.
Rossetto et al., Answer 7 of 19 of CA of STN, "Reduction of Portland Cement Paste Porosity by TEOS Impregnation," International Congress on the Chemistry of Cement, 11th, Durban, S. Africa, pp. 1449-1458, May 11-16, 2003. Rossetto et al., "Reduction of Portland Cement Paste Porosity by TEOS Impregnation," International Congress on the Chemistry of Cement, 11th, Durban, S. Africa, pp. 1449-1458, May 11-16, 2003.
Answer 40 of 60 of WPIX, JP 61102969 (Abstract Only), May 21, 1986.
Szczerba et al., Answer 23 of 29, "Organosilicone Compound Effect on the Cement Matrix" (Abstract), Proceedings of the International Congress on the Chemistry of Cement, 10th, Gothenburg, Sweden, vol. 3, Jun. 2-6, 1997.
Hamasoto et al., Answer 36 of 136 of CA on STN, JP 2003327461, Nov. 19, 2003.
Asahi, JP 2002326554 (Abstract Only), Nov. 12, 2002.
Tritthart et al., "Nitrite Binding in Cement," Cement and Concrete Research, 31, pp. 1093-1100, 2001.
Cheeseman et al., "Effect of Calcium Chloride on the Hydration and Leaching of Lead-Retarded Cement," 29, pp. 885-892, 1999.

(Continued)

*Primary Examiner* — Paul Marcantoni
(74) *Attorney, Agent, or Firm* — Eckert Seamans Cherin & Mellott, LLC; Carol A. Marmo, Esq.

(57) ABSTRACT

Methods of reducing hydroxyl ions in concrete pore solutions are provided. Such methods are useful in providing resistance to gels which form in concrete due to the alkali-silica (ASR) reaction. The methods comprise adding a salt or mixture thereof to the concrete, in aqueous or solid form, the salt or salt mixture having cations higher in valence than the anions. The methods also comprise adding an acidic phosphate or a silicon-containing alkoxide to the concrete. The methods further comprise resisting and/or inhibiting ASR in airfield runway concrete pore solutions by applying a soluble salt or a mixture of soluble salts in solution or a deicing salt mixture in situ to the runway concrete. All of the above methods are useful in reducing hydroxyl ions in concrete. Such methods can be used to resist ASR in fresh concrete, in concrete that is setting, or in hardened concrete.

10 Claims, No Drawings

OTHER PUBLICATIONS

Stark, "Lithium Salt Admixtures-An Alternative Method of Prevent Expansive Alkali-Silica Reactivity," Proceedings of the 9th International Conference on Alkali-Aggregate Reaction in Concrete, London, England, pp. 1-8, Jul. 1992.

Lea, "Resistance of Concrete to Various Organic and Inorganic Agents," The Chemistry of Cement and Concrete, Third Edition, Chapter 20, pp. 659-676, 2004.

Iler, "Figure 1.6: Solubility of Amorphous Silica Versus pH," The Chemistry of Silica, p. 42, 1979.

Rear et al., "Non-Chloride Accelerating Admixtures for Early Compressive Strength," Concrete International, pp. 55-58, Oct. 1990.

Brook et al., "A Non-Chloride Accelerating Admixture for Class CF Fly Ash," Concrete International, pp. 51-54, Oct. 1990.

Ramachandran, Concrete Admixtures Handbook: Properties, Science, and Technology, Second Edition, 1995.

Nagataki, "Hardening of Accelerators," Application of Admixtures in Concrete, pp. 34-42, 1995.

Dodson, Concrete Admixtures, Chapter 4: Set Accelerating Admixtures, pp. 73-103, 1995.

Rixom et al., Chemical Admixtures for Concrete, Chapter 5: Accelerators, Third Edition, pp. 162-198, 1999.

Gaidis, "Chemistry of Corrosion Inhibitors," Cement and Concrete Compositions, 26, pp. 181-189, 2004.

Prepared by the Minerals and Metals Sector, Natural Resources, "Lithium," Canadian Minerals Yearbook, Canada, 2004, retrieved from http://www.nrcan.gc.ca/mms/cmy/content/2004/35.pdf on Jul. 23, 2008.

* cited by examiner

METHODS OF LIMITING HYDROXYL ION CONCENTRATIONS OR THEIR EFFECTS IN CONCRETE PORE SOLUTIONS TO INTERFERE WITH ALKALI SILICA REACTION

CROSS-REFERENCE TO RELATED APPLICATIONS

This application is a continuation-in-part of U.S. patent application Ser. No. 10/972,518, filed Oct. 25, 2004, which is a continuation-in-part of U.S. application Ser. No. 10/927,733, filed Aug. 27, 2004, the contents of which are incorporated herein by reference.

FIELD OF THE INVENTION

The present invention relates to methods of reducing hydroxyl ion concentrations in pore solutions of hardened concrete and limiting the hydroxyl ions concentrations that can develop in the pore solutions of fresh concrete by the addition of inorganic or organic compounds, acids or salts such as lithium, calcium, sodium, potassium, or magnesium nitrates, nitrites, phosphates, acetates formates, oxalates or alkoxides.

BACKGROUND INFORMATION

Concrete is a conglomerate of aggregate (such as gravel, sand, and/or crushed stone), water, and hydraulic cement (such as portland cement), as well as other components and additives. Concrete is initially fluid-like when it is first made, enabling it to be poured or placed into shapes. After hardening this property is lost. When concrete is mixed, it takes about twenty-eight percent of the weight of cement as water to fully consume all the cement to produce hydration products. However, it is not possible to attain a fluid mix with this small amount of water, and more water than is needed is added. The additional water simply resides in the pores present in concrete, and is referred to as the pore liquid or pore solution.

When Portland cement is mixed with water to produce concrete, the alkali oxides present in the cement, $Na_2O$ and $K_2O$, dissolve. Alkali materials are supplied by the cement, aggregate, additives, and even from the environment in which the hardened concrete exists (such as salts placed on concrete to melt ice). Thus, the pore solution produced becomes highly basic. It is not unusual for this pore solution to attain a pH of 13.3 or higher. Depending on the aggregate used in the concrete, a highly basic pore solution may interact chemically with the aggregate. In particular, some sources of silica in aggregate react with the pore solution. This process is called the alkali-silica reaction (ASR) and may result in formation of a gelatinous substance which may swell and cause damage to the concrete. This swelling can exert pressures greater than the tensile strength of the concrete and cause the concrete to crack. The ASR reaction takes place over a period of months or years.

Although the reaction is referred to as the alkali-silica reaction, it will be appreciated that it is the hydroxyl ions that are essential for this reaction to occur. For example, ASR will not occur if silica-containing aggregates are placed in contact with alkali nitrate solutions with Na or K concentrations comparable to those which result in ASR if those solutions were alkali hydroxides.

In extreme cases, ASR can cause the failure of concrete structures. More commonly, ASR weakens the ability of concrete to withstand other forms of attack. For example, concrete that is cracked due to this process can permit a greater degree of saturation and is therefore much more susceptible to damage as a result of "freeze-thaw" cycles. Similarly, cracks in the surfaces of steel reinforced concrete can compromise the ability of the concrete to keep out salts when subjected to deicers, thus allowing corrosion of the reinforcing steel.

Concrete used for highways and bridges is periodically exposed to deicing, in which a variety of soluble salts are used, such as NaCl, $CaCl_2$ or $MgCl_2$. Deicing of a surface involves depression of the freezing point of water on the surface. It is well understood that the extent of freezing point depression is dependent mainly on the ionic strength of the aqueous solution. Thus, water containing a higher concentration of ions will freeze at a lower temperature than water containing a lower concentration of ions. For pavement applications, the primary consideration with respect to which soluble salt to use is cost. Typically, NaCl and $CaCl_2$ are used as deicing salts for pavements. Because $MgCl_2$ can be less expensive, it also is used in some applications. However, none of these deicing compounds are used on airfield runway concrete because the chlorides accelerate the corrosion of metals resulting in damage to aircraft. Thus, for airfield runway concrete, the use of deicing compounds that do not damage aircraft is of primary importance. Typical airfield runway deicing compounds are potassium acetate, sodium acetate, potassium formate or sodium formate.

It recently has been discovered that the use of potassium acetate as an airfield runway deicer causes ASR in airfield runway concrete. Set concrete, although hardened contains porosity which can be filled with an aqueous solution of solutes, referred to as "pore solution." The pore solution typically has a pH higher than 13. One of the products of hydration of cement is solid calcium hydroxide, which typically is in contact with concrete pore solution. The mechanism of airfield runway ASR has not been elucidated fully, but it has been shown that the addition of solid calcium hydroxide to a strong (e.g. 6 molar) solution of potassium acetate causes the pH of concrete pore solution to rise as high as 14 or more. Such a pH likely causes ASR in runway concrete containing siliceous aggregate, which normally would be resistant to such attack.

The following reaction is believed to occur, where the acetate anion is denoted as Ac:

KAc(aqueous)+$Ca(OH)_2$(solid) or calcium silicate hydrate (solid)→$Ca(Ac)_2$(solid)+KOH(aqueous).
(Either or both of $Ca(OH)_2$ or calcium silicate hydrate can be the calcium source.)

It also has been shown that ASR in airfield runway concrete can occur in the apparent absence of the depletion of calcium hydroxide. However, regardless of the mechanistic uncertainty, the overall mechanism for ASR must include the precipitation of the following metal acetate (Ac): $Cat^{x+} (Ac)_x$, where Cat is any cation, and x is greater than unity. Because acetate salts which include monovalent cations, such as sodium ($Na^+$) or potassium ($K^+$), are more soluble than salts which include divalent or higher valence cations, "x" most likely is an integer of 2 and $Cat^{x+}$ most likely is $Ca^{2+}$, although $Mg^{2+}$ cannot be excluded as a possibility. Nevertheless, the potassium hydroxide solution that is formed is responsible for producing the high pH, thereby promoting ASR in the concrete pore solution.

The above overall mechanism likely is generic to the application of this class of deicing salts and will occur regardless of whether the monovalent cation is $Na^+$ or $K^+$ or whether the anion is acetate or formate. Hence, other commercial or similar formulations for runway deicing using sodium acetate, sodium formate or potassium formate, or other organic sodium or potassium salts will produce the same phenomenon.

There are a number of strategies which have been used to mitigate or eliminate ASR. One strategy is to reduce the alkali content of the cement as it is being produced. It is common in cement technology to sum the amounts of $K_2O$ and $Na_2O$ present and express these as a $Na_2O$ equivalent. Cements containing less than 0.6 wt % $Na_2O$ equivalent are called low alkali. However, merely using a low alkali cement does not ensure that the alkali silica reaction can be avoided. Another common strategy is the intentional addition of a source of reactive silica, which acts to consume the alkali. Such sources are fine powders and are typically silica fume (a high surface area $SiO_2$ formed as a by-product of making ferro-silicon), fly ash (high surface area materials produced in the combustion of coal which contains $SiO_2$), and natural pozzolans (high surface area materials produced which contains $SiO_2$ and which are typically produced by volcanic action).

Another technology involves the addition of high solubility inorganic lithium compounds such as lithium hydroxide (LiOH) or lithium nitrate ($LiNO_3$). The mechanism of action of Li is not entirely resolved, but it appears to stabilize the alkali silica gels which form. These Li-containing gels then appear to provide a low permeability layer over the underlying reactive silicate material.

However, there are economic and other disadvantages with most of the above-described methods. For example, inorganic lithium salts are expensive and their ability to flow into the pore structures of concrete has not been fully established and they have, therefore, not gained much acceptance. The use of mineral admixtures such as silica fume or fly ash requires additional storage silos, and requires additional mixing. Further, silica fume is expensive, and if not properly blended into the concrete can actually cause ASR. Finally, combustion technology is changing to reduce $NO_x$ emissions, which in turn makes fly ash less reactive and thus less suitable as an additive to reduce ASR. Beyond this, fly ash and silica fume are not suitable for treatment of existing structures. There remains a need for economic and effective methods of reducing ASR in concrete.

SUMMARY OF THE INVENTION

The present invention solves the above needs by providing methods of reducing hydroxyl ions in concrete. In one aspect, the present invention provides a method of limiting or reducing hydroxyl ions in concrete pore solutions containing alkali metal cations and hydroxyl ions, comprising applying to hardened concrete as an aqueous solution or non-aqueous solution or mixing with fresh concrete as a particulate solid or as an aqueous or non-aqueous solution, a soluble salt or mixture thereof. The salt comprises a cation, denoted herein as Cat, and an anion, denoted herein as An, the cation having a higher valence than the anion. Additionally, the Cat-An salt should have a solubility in water that is greater than Cat-OH, such that when the Cat-An salt dissociates and the Cat precipitates as Cat-OH, the resulting alkali metal-An salt formed remains in solution or has a solubility in the concrete pore solution greater than that of said Cat-An salt. The number of OH ions incorporated in Cat-OH will be the value needed to achieve electroneutrality.

In another aspect, the present invention provides a method of limiting or reducing hydroxyl ions in concrete pore solutions containing alkali metal cations and hydroxyl ions, comprising adding a salt to the concrete, wherein the salt comprises a cation and an anion, in which the cation has a higher valence than the anion. In this embodiment, the Cat-An salt will have a solubility in concrete pore solutions having pH values higher than that of a saturated $Ca(OH)_2$ solution in water that is greater than Cat-OH, such that when said Cat-An salt precipitates as Cat-OH the resulting alkali metal-An salt formed remains in solution or has a solubility in water greater than that of said Cat-An salt. This embodiment embraces those anions such as oxalate which are less soluble than Cat-OH in water, but which become more soluble than Cat-OH when the pH of the solution reaches about 13.

In an additional aspect, the present invention provides a method of limiting or reducing hydroxyl ions in concrete pore solutions, comprising adding an acidic phosphate to the concrete.

In yet a further aspect, the present invention provides a method of limiting or reducing hydroxyl ions in concrete pore solutions, comprising adding a silicon-containing alkoxide to the concrete. The silicon-containing alkoxide has the formula $(RO)_xSiR'_{(4-x)}$, where x can be 1 to 4, R is an alkyl, alkenyl or alkynl group of one or more carbons, straight or branched, and each R can be the same or different from each other R or R'.

This aspect of the present invention includes mixing the above-described silicon alkoxides with an organic source of lithium as a lithium alkoxide, such as $LiOCH_3$ or $LiOC_2H_5$, for addition to concrete. The constituents of the mixture react with the formation of lithium silicate gel within the concrete [Sol-gel processing of lithium disilicate. Crystallization and microstructure development of coatings, J. Mater. Sci., Vol. 30, p 6192 (1995)], wherein the chemical evolution of this gel within the concrete will interfere with the ASR. This method is distinguished from U.S. Pat. No. 5,755,876 to Stokes et al., U.S. Pat. No. 6,022,408 to Stokes et al.; and U.S. Pat. No. 5,750,276 to Page), all of which merely teach the use of lithium salts and not the use of neutral lithium compounds that eventually hydrolyze to form lithium silicate glass which limit ASR within the concrete.

In still another aspect, the present invention provides a method of resisting and/or inhibiting alkali-silica reaction (ASR) in concrete pore solution, comprising applying to runway concrete a mixture of at least two soluble salts, each of the salts comprised of a cation (Cat) and an anion (An), in which the Cat has a higher valence than the An, and in which the Cat-An salt has a solubility in the concrete pore solution that is greater than Cat-OH, such that when the Cat-An salt precipitates out of the concrete pore solution as Cat-OH, the resulting alkali metal-An salt formed remains in the concrete pore solution or has a solubility in the concrete pore solution greater than that of the Cat-An salt. In this method, the mixture of the at least two soluble salts can be formulated as a deicer in order to depress the freezing point of water as well as to resist and/or inhibit ASR in the concrete pore solution. The deicer of the present invention is able to buffer the concrete pore solution which contains alkali metal cations and hydroxyl ions, so as to reduce hydroxyl ions in the concrete pore solution. As used herein, "pore solution" is meant to refer to an aqueous solution of solutes that is contained within the porous architecture of set, i.e., dried, concrete.

In this method, the mixture of the at least two soluble salts can be applied to concrete either in situ as a deicer salt mixture to depress the freezing point of water as well as to resist and/or inhibit ASR in concrete pore solution, or the mixture of the at least two soluble salts can be applied to concrete in an aqueous or non-aqueous solution, such as an alcoholic solution to resist and/or inhibit ASR in the concrete pore solution regardless of the need for deicing. In the event that the concrete to be remediated is airfield runway concrete, the mixture of the at least two soluble salts or deicing salt mixture will not harm aircraft alloys and will not elevate the pH of the concrete pore solution to above about 13.

Suitable cations for use in the above-described method include, but are not limited to, sodium, potassium, magnesium, calcium or lithium.

Suitable anions for use in the above-described method include, but are not limited to, nitrates, nitrites, acetates, formates, phosphates or oxalates.

For example, one soluble salt which is suitable for use in this method is a monobasic alkali phosphate, such as $NaH_2PO_4$ or $KH_2PO_4$. Additionally, the cations of each of the soluble salts can have at least a divalent valence.

In all of the above methods, hydroxyl ions are substantially reduced in existing (i.e., hardened) concrete pore solutions and substantially limited in fresh concrete pore solutions. While the alkali-silica reaction has been recognized for decades, it was generally not thought to be a problem of excess hydroxyl ions in the pore solution, and remediation efforts did not focus on this aspect. Additionally, the addition of acids to concrete was thought to have a detrimental effect on the desired properties of the concrete. See, e.g., Lea, *The Chemistry of Cement and Concrete*, pp. 659-676 (Ch 20), which describes the actions of various compounds on concrete, including ammonium acetate, aluminum nitrate, lactic acid, acetic acid, tartaric acid, citric acid and malic acid. All of these are stated to cause attack on the concrete. Oxalic acid exhibits only a minor effect due to the low solubility of calcium oxalate.

It is an object of the present invention, therefore, to provide methods of reducing hydroxyl ions in existing concrete and limiting hydroxyl ions in fresh concrete.

It is an additional object of the present invention to provide a method of reducing hydroxyl ions in existing concrete and limiting hydroxyl ions in fresh concrete by the addition of a salt, an acidic phosphate, or a silicon-containing alkoxide.

It is yet another object of the present invention to provide a method for applying a mixture of at least two soluble salts to concrete pore solution to reduce hydroxyl ions in the concrete pore solution so as to resist and/or inhibit ASR in the concrete pore solution.

It is still another object of the present invention to provide a method for applying a deicing salt mixture to concrete pore solution in order to depress the freezing point of water on the surface of the concrete, in which the deicer also exhibits a buffering action within the concrete pore solution so as to reduce hydroxyl ions in the concrete pore solution and thus resist and/or inhibit ASR in the concrete pore solution.

These and other aspects of the present invention will become more readily apparent from the following detailed description and appended claims.

DETAILED DESCRIPTION OF PREFERRED EMBODIMENTS

In an embodiment of the present invention, a method is provided for reducing or limiting hydroxyl ions in concrete pore solutions containing alkali metal cations and hydroxyl ions, comprising adding a salt to the concrete. The salt comprises a cation, denoted herein as Cat, and an anion, denoted herein as An, the cation having a higher valence than the anion. Additionally, the Cat-An salt should have a solubility in water that is greater than Cat-OH, such that when the Cat-An salt dissociates, the Cat-OH precipitates, and the resulting alkali metal-An salt formed remains in solution or has a solubility in the concrete pore solution greater than that of the Cat-An salt. The number of OH ions incorporated in Cat-OH will be the value needed to achieve electroneutrality.

In another embodiment, the present invention provides a method of reducing or limiting hydroxyl ions in concrete pore solutions containing alkali metal cations and hydroxyl ions, comprising adding a salt to the concrete, wherein the salt comprises a Cat and an An, the Cat having a higher valence than the An. In this embodiment, the Cat-An salt will have a solubility in concrete pore solutions having pH values higher than that of a saturated calcium hydroxide [$(Ca(OH)_2$] solution in water that is greater than Cat-OH, such that when the Cat-An salt precipitates as Cat-OH the resulting alkali metal-An salt formed remains in solution or has a solubility in water greater than that of the Cat-An salt. This embodiment embraces those anions, such as oxalate described below, which are less soluble than Cat-OH in water, but which become more soluble than Cat-OH when the pH of the solution reaches about 13.

Any salt containing a suitable cation can be used, so long as the cation has a valence higher than that of the anion and the salt meets the above listed criteria. Suitable cations include, but are not limited to, Ca, Fe, Mg, Mn, Al, Cu, Zn, Sr, Ti and combinations of these. Preferred cations are Ca, Mg, Fe and Al. The most preferred cation is Ca.

Similarly, any salt with a suitable anion can be used, provided that the valence and solubility criteria described above are met. Additionally, the anion must be innocuous in concrete, and should not substantially affect the desirable qualities of concrete such as hardening and durability, and should not subject the reinforcing steel elements in concrete to attack. Thus, certain anions such as chlorides, sulfates and carbonates would not be suitable for use in concrete. Suitable anions can be either organic and inorganic anions, including, but not limited to, nitrate, nitrite, acetate, benzoate, butyrate, citrate, formate, fumarate, gluconate, glycerophosphate, isobutyrate, lactate, maleate, methylbutyrate, oxalate, propionate, quinate, salicylate, valerate, chromate, tungstate, ferrocyanide, permanganate, monocalcium phosphate monohydrate ($Ca(HPO_4)_2 \cdot H_2O$), hypophosphate, and combinations thereof. Preferred anions include nitrate, nitrite, acetate and oxalate. This list is not meant to be exhaustive, and organic anions that are polymers, such as ionomers and polyelectrolytes, and/or oligomers can be used, provided that they meet the criteria described above. Examples of suitable salts are found in Tables 1, 2 and 3.

As will be appreciated by one skilled in the art, the salt can be added to fresh concrete, in solid or aqueous form, or can be introduced into hardened concrete as an aqueous solution. The salt can also be used to remediate existing concrete by means of an overlay, and can be added to the fresh overlay or the hardened overlay as desired. As used herein, the term "added", as in "added to concrete", means the addition of the hydroxyl-limiting material to fresh concrete in solid or aqueous form, as well as the introduction of the hydroxyl-reducing material into hardened concrete, typically in aqueous form. Methods of mixing the components used to make concrete are standard and well known in the art.

As described more fully below in the examples, the amount of salt added will be that amount sufficient to bring the effective $Na_2O$ equivalent to an amount which is less than the effective $Na_2O$ equivalent in the cement used in the concrete, more preferably to an amount which is sufficient to bring the effective $Na_2O$ equivalent to less than about 0.8% by weight of the cement in the concrete, most preferably to less than about 0.6% by weight of cement in said concrete.

Using calcium nitrate as an example, the following reaction will occur:

$$Ca(NO_3)_2 \cdot xH_2O_{(s\ or\ aq)} + 2AOH_{(aq)} \rightarrow Ca(OH)_{2(s)} + 2ANO_{3(aq)}.$$

(wherein A=Na and/or K (wherein A=Na and/or K)
This reaction consumes hydroxyls and, provided that the salt is added in sufficient quantity, it limits the OH concentration to that provided by the calcium hydroxide. Note that even if the salt is added in great excess, the OH concentration will remain nominally the same, namely that of calcium hydroxide.

There is a specific advantage to an organic salt that has molar solubility close to that of calcium hydroxide. Additions of salts to the mixing water may cause acceleration of the rate of setting. This is undesirable when concrete is placed in warm weather. If the common ion effect of calcium on some of the organic salts is considered, their dissolution will be retarded by elevated calcium ion concentrations in solution. Thus, during the early hydration, the calcium entering solution as a result of cement hydration will inhibit the dissolution organic Ca salts. However, as the Ca drops in response to Na and K entering solution, through the common ion effect of hydroxyl ion on the solubility of calcium hydroxide, then the organic salts will dissolve, and in doing so reduce the hydroxyl ion concentration. Using nitrate salts as examples of the reactions of interest are as follows: (wherein A=Na and/or K)

$$Al(NO_3)_3 \cdot xH_2O_{(s\ or\ aq)} + 3AOH_{(aq)} \rightarrow Al(OH)_{3(s)} + 3ANO_{3(aq)}$$

$$Fe(NO_3)_3 \cdot xH_2O_{(s\ or\ aq)} + 3AOH_{aq} \rightarrow Fe(OH)_{3(s)} + 3ANO_{3(aq)}$$

Alternatively:

$$Fe(NO_3)_3 \cdot xH_2O_{(s\ or\ aq)} + 3AOH_{(aq)} \rightarrow FeOOH_{(s)} + 3ANO_{3(aq)}$$

$$Fe(NO_3)_2 \cdot xH_2O_{(s\ or\ aq)} + 2AOH_{(aq)} \rightarrow Fe(OH)_{2(s)} + 2ANO_{3(aq)}$$

$$Ca(NO_2)_2 \cdot xH_2O_{(s\ or\ aq)} + 2AOH_{(aq)} \rightarrow Ca(OH)_{2(s)} + 2ANO_{2(aq)}$$

$$Ca(NO_3)_2 \cdot xH_2O_{(s\ or\ aq)} + 2AOH_{(aq)} \rightarrow Ca(OH)_{2(s)} + 2ANO_{3(aq)}$$

$$Mg(NO_2)_2 \cdot xH_2O_{(s\ or\ aq)} + 2AOH_{(aq)} \rightarrow Mg(OH)_{2(s)} + 2ANO_{2(aq)}$$

$$Mg(NO_3)_2 \cdot xH_2O_{(s\ or\ aq)} + 2AOH_{(aq)} \rightarrow Mg(OH)_{2(s)} + 2ANO_{3(aq)}$$

$$Zn(NO_2)_2 \cdot xH_2O_{(s\ or\ aq)} + 2AOH_{(aq)} \rightarrow Zn(OH)_{2(s)} + 2ANO_{2(aq)}$$

$$Zn(NO_3)_2 \cdot xH_2O_{(s\ or\ aq)} + 2AOH_{(aq)} \rightarrow Zn(OH)_{2(s)} + 2ANO_{3(aq)}$$

$$Sr(NO_2)_2 \cdot xH_2O_{(s\ or\ aq)} + 2AOH_{(aq)} \rightarrow Sr(OH)_{2(s)} + 2ANO_{2(aq)}$$

$$Sr(NO_3)_2 \cdot xH_2O_{(s\ or\ aq)} + 2AOH_{(aq)} \rightarrow Sr(OH)_{2(s)} + 2ANO_{3(aq)}$$

$$Sn(NO_2)_2 \cdot xH_2O_{(s\ or\ aq)} + 2AOH_{(aq)} \rightarrow Sn(OH)_{2(s)} + 2ANO_{2(aq)}$$

$$Sn(NO_3)_2 \cdot xH_2O_{(s\ or\ aq)} + 2AOH_{(aq)} \rightarrow Sn(OH)_{2(s)} + 2ANO_{3(aq)}$$

The free water produced in these reactions is ignored. x may be 0 for anhydrous nitrates and nitrites or may be various numbers specific to a particular compound. Some nitrates and nitrite compounds may have a number of different hydrates, and in these cases there will be a range of possible values for x.

More generalized versions of the above equations are as follows:

$$Cat(An)_2 \cdot xH_2O_{(s\ or\ aq)} + 2AOH_{(aq)} \rightarrow Cat(OH)_{2(s)} + 2AAn_{(aq)}$$

$$Cat(An)_3 \cdot xH_2O_{(s\ or\ aq)} + 3AOH_{(aq)} \rightarrow Cat(OH)_{3(s)} + 3AAn_{(aq)}$$

where Cat refers to cation, An refers to anion, and A refers to alkali metal.

The possibility of the formation of a soluble intermediate $ASn(OH)_3$ is recognized. The above list is exemplary and not meant to be exhaustive, and 4 and 5 valent nitrates and nitrites can also be used:

Eg. $Ti(NO_3)_4 \cdot xH_2O_{(s\ or\ aq)} + 4AOH_{(aq)} \rightarrow TiO_{2(s)} + 4ANO_{3(aq)}$ In a further embodiment, the present invention provides a method of reducing hydroxyl ions in concrete pore solutions, comprising adding an acidic phosphate to the concrete. Any suitable acidic phosphate can be used, so long as it has the ability to release a proton in exchange for picking up a $Na^+$ or $K^+$. Preferably, the acidic phosphate is phosphoric acid, monobasic phosphate, or dibasic phosphate, or combinations of these. The cation of the acidic phosphate can be selected from the group consisting of $Na^+$, $K^+$, $NH_4^+$ and combinations thereof. The acidic phosphate can be added to fresh concrete as a solid or as an aqueous solution, and can also be introduced into hardened concrete. It can also be used in an overlay over existing concrete, as described above. The amount used is as described above for addition of a salt.

The following reaction, by way of example only, illustrates this aspect of the present invention:

E.g. $NaH_2PO_{4(s\ or\ aq)} + Na^+ + OH^- \rightarrow Na_2HPO_{4(s\ or\ aq)} + HOH$ In this, a buffering reaction, monobasic sodium phosphate is converted to dibasic sodium phosphate. In this conversion a proton is liberated and its reaction with a hydroxyl produces water. This class of reactions differs from those described above because a solid hydroxide is not precipitated.

In *The Chemistry of Silica* by Iler, (FIG. 1.6, p. 42) the solubility of amorphous silica as a function of pH is shown. Solubility increases by a factor of about 10 or more between pH 9 and pH 11, and continues to increase with further pH elevation. Certain types of aggregate used in concrete contain silicate minerals which show elevated silica solubility at the pH values normally present in concrete pore solutions. The elevated pH values of these solutions are the result of the presence of alkali hydroxides.

It is has been recognized that alkali silicates in liquid form may be added to concrete as a means of pore blocking. For example, potassium silicate solutions may be added to hardened concrete to react with available calcium hydroxide to produce calcium silicate hydrate. However, this would not be an acceptable means for mitigating the effects of ASR because the reactions involved also produce a potassium hydroxide solution.

As described above, basicities of concrete pore solutions can be reduced by the addition of salts comprised of a polyvalent cation and an anion of a strong acid. Another method to achieve a reduction in hydroxyl ion concentration is the direct addition of an appropriate acid species. The direct addition of an acid at the time of mixing of fresh concrete is theoretically possible, provided an appropriate acid could be found. Addition of an acid to hardened concrete is also theoretically possible, provided that such an acid could be found and could be made to intrude the concrete pore structure.

One such acid is silicic acid. It is also accepted that hydrous silica is an acid: $SiO_2 \cdot 2H_2O = H_4SiO_4$. Acidic silicates in solid form, including those present in fly ash, in silica fume, and in natural pozzolans, are routinely added to fresh concrete. Thus, a method by which hydrous silica could be added to in-place concrete also has the capability of reducing the alkali-silica reaction. Such a method involves the addition of a silicon-containing alkoxide. Commonly available alkoxides include tetramethyloxysilane (TMOS) $(CH_3O)_4Si$, tetraethyloxysilane (TEOS) $(C_2H_5O)_4Si$, and ethyl silicate 40. The latter is a solution of partially hydrolyzed TEOS comprised of oligomers containing on average 5 silicon atoms per oligomer. These alkoxides produce hydrous silica by a combination of hydrolysis and condensation reactions.

Using TEOS as an example, the following hydrolysis reactions occur to produce an amorphous silicate:

$$(C_2H_5O)_4Si + H_2O \rightarrow (C_2H_5O)_3SiOH + C_2H_5OH.$$

$$(C_2H_5O)_3SiOH + H_2O \rightarrow (C_2H_5O)_2Si(OH)_2 + C_2H_5OH$$

$$(C_2H_5O)_2Si(OH)_2 + H_2O \rightarrow C_2H_5OSi(OH)_3 + C_2H_5OH$$

$$C_2H_5OSi(OH)_3 + H_2O \rightarrow Si(OH)_4 + C_2H_5OH$$

More broadly, these equations can be written as:

$$(RO)_4Si + H_2O \rightarrow (RO)_3SiOH + ROH.$$

$$(RO)_3SiOH + H_2O \rightarrow (RO)_2Si(OH)_2 + ROH$$

$$(RO)_2Si(OH)_2 + H_2O \rightarrow ROSi(OH)_3 + ROH$$

$$ROSi(OH)_3 + H_2O \rightarrow Si(OH)_4 + ROH$$

Each hydrolysis step produces a molecule of ethanol. Simultaneously, condensation reactions, such as the following, occur:

$$(C_2H_5O)_3SiOH + (C_2H_5O)_3SiOH \rightarrow (C_2H_5O)_3SiOSi(C_2H_5O)_3 + H_2O$$

or, more broadly, $(RO)_3SiOH + (RO)_3SiOH \rightarrow (RO)_3SiOSi(RO)_3 + H_2O$ The condensation reactions are polymerization reactions in which a simple molecule is eliminated from the silicate and an oxygen-silicon-oxygen bond is formed.

Thus, in an additional embodiment, the present invention provides a method of reducing hydroxyl ions in concrete pore solutions, comprising adding a silicon-containing alkoxide to the concrete. The silicon-containing alkoxide has the formula $(RO)_xSiR'_{(4-x)}$, where x can be 1 to 4, R is an alkyl, alkenyl or alkynl group of one or more carbons, straight or branched, and each R can be the same or different from each other R or R'. Preferred silicon-containing alkoxides are tetramethyloxysilane, tetraethyloxysilane and ethyl silicate 40, a silicon-containing alkoxide that is partially hydrolyzed TEOS to achieve a Si content above 28% by weight, and optimally 40% by weight.

The length of the carbon chain in the alkoxide will be limited by the silicon-containing alkoxide's solubility in water. When the molecule becomes so insoluble (as with longer carbon chains) that it hydrolyzes very slowly or not at all, the compound will be inadequate for controlling the ASR reaction. As will be appreciated, the rate of hydrolysis is also a function of the pH of the solution and the susceptibility of aggregate materials to be attacked. The suitability of a particular silicon-containing alkoxide can be easily determined by one skilled in art without undue experimentation, using empirical methods such as testing the compound in concrete or in pore solutions for its ability to remove hydroxyl ions from the concrete or pore solution.

As with prior embodiments, the silicon-containing alkoxide can be added to fresh concrete, in solid or aqueous form, and introduced into hardened concrete in aqueous form. It can also be added to fresh concrete for use as an overlay over existing concrete, or is introduced into a hardened concrete overlay over existing concrete. The amount used will be an amount sufficient to provide a sufficient number of protons to reduce the effective $Na_2O$ content of the cement in the concrete to less than about 0.8% by weight of cement, more preferably to less than about 0.6% by weight of cement or less. In all of the above methods, the amount used can also be an amount sufficient to bring the effective $Na_2O$ equivalent to an amount which is less than the effective $Na_2O$ equivalent of the cement used in said concrete.

TABLE 1

| Compound | solubility g/100 cc | mol wt | molar solubility |
|---|---|---|---|
| Ca hydroxide | 0.16 | 72 | 0.0223 |
| Ca acetate | 37.4 (0) | 158 | 2.36 |
| Ca benzoate | 2.7 (0) | 336 | 0.08 |
| Ca butyrate | soluble | 268 | |
| Ca citrate | 0.85 (18) | 570 | 0.015 |
| Ca formate | 16.2 (20) | 130 | 1.25 |
| Ca fumarate | 2.11 (30) | 205 | 0.103 |
| Ca d-gluconate | 3.3 (15) | 448 | 0.074 |
| Ca glycerophosphate | 2 (25) | 210 | 0.19 |
| Ca isobutyrate | 20 | 304 | 0.658 |
| Ca lactate | 3.1 (0) | 308 | 0.101 |
| Ca maleate | 2.89 (25) | 172 | 0.168 |
| Ca methylbutryate | 24.24 (0) | 242 | 1.002 |
| Ca propionate | 49 (0) | 204 | 2.402 |
| Ca l-quinate | 16 (18) | 602 | 0.266 |
| Ca salicyate | 4 (25) | 350 | 0.114 |
| Ca valerate | 8.28 (0) | 242 | 0.342 |
| Ca nitrate | 121.2 (18) | 164 | 7.39 |
| Ca chromate | 16.3 (20) | 192 | 0.849 |
| Ca ferrocyanide | 80.8 (25) | 490 | 1.649 |
| Ca permanganate | 331 (14) | 368 | 8.995 |
| Ca MCPM | 1.8 (20) | 252 | 0.071 |
| Ca hypophosphate | 15.4 (25) | 170 | 0.906 |
| Mg(OH)2 | .0009 (18) | 58 | $5.6 \times 10^{-11}$ |
| Mg laurate | .007 (25) | 459 | $1.5 \times 10^{-4}$ |
| Mg myristrate | .006 (15) | 479 | $1.3 \times 10^{-4}$ |
| Mg oleate | .024 (5) | 587 | $4.1 \times 10^{-4}$ |
| Mg oxalate | .07 (16) | 148 | $4.7 \times 10^{-3}$ |
| Mg stearate | .003 (14) | 591 | $5.1 \times 10^{-5}$ | value in parenthesis is the temperature at which the solubility was determined.

TABLE 2

| Compound name | Formula | abbr | mol wt | sol. g/100 cc | at °C. | Advantages or Disadvantages |
|---|---|---|---|---|---|---|
| aluminum nitrate nonohydrate | Al(NO3)3•9H2O | ANN | 375.13 | 63.7 | 25 | (−) sulfate attack |
| calcium nitrate tetrahydrate | Ca(NO3)2•4H2O | CNT | 236.15 | 266 | 0 | Stability question |

TABLE 2-continued

| Compound name | Formula | abbr | mol wt | sol. g/100 cc | at °C. | Advantages or Disadvantages |
|---|---|---|---|---|---|---|
| calcium nitrate anhydrous | Ca(NO3)2 | CN | 164.09 | 121 | 18 | |
| calcium nitrite monohydrate | Ca(NO2)2•H2O | CAN | 150.11 | 45.9 | 0 | (−) expense |
| chromium nitrate | | | | | | (−) toxic |
| ferrous nitrate | | | | | | Stability question |
| ferric nitrate nonohydrate | Fe(NO3)3•9H2O | FNN | 404.2 | sol | | (−) color |
| ferric nitrate hexahydrate | Fe(NO3)3•6H2O | FNH | 348.4 | | | |
| copper nitrate hexahydrate | Cu(NO3)2•6H2O | | 295.64 | 243.7 | 0 | |
| copper nitrate trihydrate | Cu(NO3)2•3H2O | | 241.6 | 137.8 | 0 | |
| copper nitrate 2.5hydrate | Cu(NO3)2•2.5H2O | | | | | |
| magnesium nitrate dihydrate | Mg(NO3)2•2H2O | MND | 184.35 | sol | | (+) expense |
| magnesium nitrate hexahydrate | Mg(NO3)2•6H2O | MNH | 256.41 | 125 | | |
| manganese nitrate tetrahydrate | Mn(NO3)2•4H2O | | 251.01 | 426.4 | 0 | |
| strontium nitrate anhydrous | Sr(NO3)2 | SN | 211.63 | 70.9 | 18 | |
| strontium nitrate tetrahydrate | Sr(NO3)2•4H2O | SNT | 283.69 | 60.43 | 0 | |
| zinc nitrate trihydrate | Zn(NO3)2•3H2O | | 243.43 | | | |
| zinc nitrate hexahydrate | Zn(NO3)2•6H2O | | 297.47 | 181.3 | 20 | | molality = (wt in g of solid)(1/mw)/1000 g of H2O. 10% soln = 100 g solid + 900 g H2O = 111.1 g solid/1000 g soln or 111.1 g of solid per 1000 g of sol'n

TABLE 3

| Formula | 10 wt % soln, molality | molality X moles NO3 | wt solid, g | wt H2O + Solid | wt % solid, g | soln pH | Wt NaOH/ Ca(OH)2 soln*, g | Wt of nitrate soln added, g | pH after add'n |
|---|---|---|---|---|---|---|---|---|---|
| Al(NO3)3•9H2O | 0.296 | 0.888 | 5.02 | 51.79 | 9.69 | 1.85 | 39.51 | 8.67 | 12.34 |
| Ca(NO3)2•4H2O | 0.47 | 0.92 | 5.2 | 52.08 | 9.98 | 5.38 | 41.76 | 13.61 | 12.36 |
| Ca(NO3)2 | 0.677 | 1.334 | | | | | | | |
| Ca(NO2)2•H2O | 0.74 | 1.48 | | | | | | | |
| Fe(NO3)3•9H2O | 0.274 | 0.822 | 5.04 | 54.07 | 9.32 | 0.3 | 39.44 | 11.64 | 12.46 |
| Fe(NO3)3•6H2O | 0.319 | 0.958 | | | | | | | |
| Cu(NO3)2•6H2O | 0.378 | | | | | | | | |
| Cu(NO3)2•3H2O | 0.46 | | 5.07 | 50.98 | 9.93 | | | | |
| Cu(NO3)2•2.5H2O | | | | | | 2.87 | | | |
| Mg(NO3)2•2H2O | 0.602 | 1.204 | | | | | | | |
| Mg(NO3)2•6H2O | 0.433 | 0.866 | 5.08 | 50.07 | 10.14 | 4.91 | 42.78 | 18.03 | 12.56 |
| Mn(NO3)2•4H2O | 0.443 | 0.886 | | | | | | | |
| Sr(NO3)2 | 0.525 | 1.05 | | | | | | | |
| Sr(NO3)2•4H2O | 0.392 | 0.784 | | | | | | | |
| Zn(NO3)2•3H2O | 0.456 | 0.912 | | | | | | | |
| Zn(NO3)2•6H2O | 0.373 | 0.746 | | | | | | | |

*0.3M NaOH + 10 g Ca(OH)2 + 0.005M Na2SO4
pH before any additions = 13.02

Accelerating admixtures containing calcium nitrate, calcium nitrite, and calcium formate have been added to fresh concrete to accelerate hydration in cool weather. However, the use of salts as ASR admixtures is distinguishable over the use of salts as accelerating admixtures.

Accelerating admixtures are used in cool weather and are applied to fresh concrete. ASR admixtures, on the other hand, may be used in warm weather and may be applied to concrete that is setting or hardened concrete. "Fresh concrete" refers to the aqueous or slurry-like mixture of water, cement, and aggregate that is mixed together to form new concrete. "Setting concrete" refers to concrete that is changing from a slurry into a solid and has reached or passed through the "set point," which is the point at which the concrete is no longer in a plastic state. Concrete is considered to be setting once it has reached or passed through the time of initial set. "Setting speed" refers to the rate at which the concrete is setting. "Hardened concrete" refers to concrete that is substantially solidified. The alkali silica reaction may be treated in fresh concrete, concrete that is setting, or hardened concrete.

Accelerating admixtures typically are used at room temperature or below, with a preferred ambient temperature range of about 50° F. or below. WR Grace markets Daracel, a commercial accelerating admixture that contains calcium chloride, and recommends it for use at an ambient temperature of 50° F. and below. (The addition level for Daracel is 8-40 oz per 100 lb of cement.) Rear and Chin (Concrete Intl., 12:55-58, 1990) tested non-chloride accelerating admixtures at 10 and 22° C. Brook et al. (Concrete Intl 12:55-58, 1990) tested non-chloride accelerating admixtures at 10 and 21° C. The ability of calcium formate to accelerate hydration is substantially diminished when the ambient temperature is raised from 70° F. to 100° F. At 70° F., the time of set decreases from about 3.25 hr to 2 hr in going from 0 to 2 percent calcium formate. At 100° F., the time of set decreases from about 1.25 to about 0.75 hr in going from 0 to 2 percent calcium formate (V. S. Ramachandran: Concrete Admixtures Handbook, $3^{rd}$ Ed., 1995).

When used as ASR admixtures in warm weather, salts may be combined with a retarding admixture such as calcium lignosulfonate or sodium and calcium salts of hydrocarboxylic acids, including salts of gluconic, citric, and tartaric acids. For example, calcium lignosulfonate may be added along with calcium nitrate. Such retarding agents would not be used in conjunction with an accelerating admixture.

When a salt such as calcium nitrate, calcium nitrite, or calcium formate is used as an ASR admixture, it may be mixed with other calcium salts not known to be accelerators, e.g., calcium acetate or calcium hydroxide. This would not be done if the salt is being used as an accelerating admixture. In addition, it is unlikely that calcium acetate would be used as an accelerator.

Another distinction is that the dosages of calcium nitrate, calcium nitrite, or calcium formate, when used as accelerating admixtures, vary depending on the temperature whereas the dosages of calcium nitrate, calcium nitrite, or calcium formate, when used as ASR admixtures, are independent of temperature and substantially depend on $Na_2O$ equivalent in the cement. For a given concrete mix design, the dosages of calcium nitrate, calcium nitrite, or calcium formate, when used as ASR admixtures, will be constant and will depend substantially on the alkali content of the cement, whereas the dosages of calcium nitrate, calcium nitrite or calcium formate, when used as accelerating admixtures, will depend on the temperature and on the desired rate of strength gain.

In the case of ASR admixtures, the addition of calcium nitrate, calcium nitrite, or calcium formate can be delayed anywhere from one day to several years following the mixture of fresh concrete. Even with a delayed addition, these salts will be effective at resisting ASR. However, when calcium nitrate, calcium nitrite, or calcium formate are used as accelerating admixtures, the addition of these compounds cannot be delayed. With a delayed addition, the salts will not be effective at accelerating hydration; the salts' ability to accelerate hydration decreases as the fresh concrete begins to set and harden. Furthermore, calcium nitrate, calcium nitrite, or calcium formate, when used as ASR admixtures, remain effective when introduced to the pore structure of concrete that has already hardened, whereas the introduction of calcium nitrate, calcium nitrite or calcium formate as accelerating admixtures would have no effect on the strength of hardened concrete.

An accelerating admixture is most effective at 1 day, somewhat less effective at 7 days, even less effective at 28 days, and of no importance at 1 year. The timeframe over which the alkali silica reaction occurs is minimally months and most importantly years. Thus, the timeframes during which ASR treatment is relevant do not overlap the timeframes during which acceleration is relevant. According to A. M. Paillere, (Ed., Applications of Admixtures in Concrete, 1995), calcium formate increases compressive strengths at 28 days, and calcium nitrite increases compressive strength at 1, 3, and 28 days (p. 40); calcium nitrate accelerates setting times (measured in hours) but only moderately accelerates hardening (p. 37).

To delay the release of an ASR admixture, the particles may be coated with a dissolving agent such as a polymer. In a particular embodiment, crystals of soluble salts, such as calcium nitrate or calcium nitrite, may be encased by coatings used in the formation of pharmaceutical tablets. Such coatings may include those used in time-release analgesics and would be intended to survive until final set or longer at which point they would dissolve and release the encased salts. The Aveka Group offers commercially available processes for coating particulate materials, including spray drying and prilling, and dry powder coating. The coating solution may contain dissolved polymer, sugar, inorganic salts, sol gels, or other dissolved materials. Methylcellulose or another time release coating may also be used. Delayed release would interfere with acceleration of the concrete, but would have no effect on control of ASR.

Table 4 below (from R. Rixom and N. Mailvagnam: Chemical Admixtures for Concrete, 3rd Ed., 1999, p. 183) shows the effects of calcium nitrite on strength development.

TABLE 4

| | Compressive strength, MPa | | |
|---|---|---|---|
| % admixture | 1 day | 7 days | 28 days |
| 0 | 9.0 | 23.5 | 24.7 |
| 2 | 11.1 | 31.3 | 39.5 |
| 3 | 13.5 | 34.2 | 40.7 |
| 4 | 15.8 | 36.8 | 44.0 |
| 5 | 16.3 | 36.7 | 44.8 |
| | No statistically meaningful change beyond 3-4% | No statistically meaningful Change beyond 3% | No statistically meaningful change beyond 2% |

It appears that the broad range for use of a salt as an accelerator is about 2 to 5 percent, with a preferred range of about 3 percent or below for calcium nitrite and 2 percent or below for calcium formate (V. S. Ramachandran: Concrete Admixtures Handbook, $3^{rd}$ Ed., 1995).

This illustrates another difference between the use of salts as accelerators and the use of salts as ASR admixtures. The amount of ASR admixture added to the concrete is directly proportional to the quantity of hydroxyl ions removed from the pore solution. For every mole of an ASR admixture comprised of calcium nitrate, calcium nitrite, or calcium formate added to a given amount of concrete, two moles of hydroxyl ions will be removed as $Ca(OH)_2$. Thus, the relationship between the amount of ASR admixture and the amount of hydroxyl ions removed from the pore solution may be a straight line.

Another distinction is that calcium nitrite as an accelerator has been combined with calcium rhodonate-triethylamine to achieve acceleration (V. S. Ramachandran: Concrete Admixtures Handbook, $3^{rd}$ Ed., 1995, p. 170). This would not be the case if calcium nitrite was used as an ASR admixture. In addition, use of calcium nitrate in conjunction with triethanolamine as an accelerating admixture was proposed in 1981 (V. Dodson, Concrete Admixtures, 1990, p. 92). Such would not be the case when calcium nitrate is used as an ASR admixture. Moreover, calcium nitrite would not typically be added unless there was a concern for corrosion of embedded steel.

Additionally, when calcium nitrite in particular is used as an ASR admixture, it also acts as a corrosion inhibitor for concrete. Its mechanism of action is as follows: When road salt is applied to concrete, the chloride contained in the road salt makes its way down to reinforcing steel in the concrete. The chloride catalyzes the corrosion of the steel to produce ferrous ion. If nitrite ion is present in the solution immediately surrounding the steel, it rapidly oxidizes the ferrous ion to ferric ion and then to $Fe(OH)_3$, which rapidly precipitates. This precipitation event produces a physical barrier of oxide on the surface of the steel, which affords it some protection from further corrosion.

The very same mechanism of action to prevent concrete corrosion is achieved by using magnesium nitrite in ASR admixture. Therefore, in another embodiment of the present invention, magnesium nitrite is used to inhibit concrete corrosion as well as to mitigate ASR.

Calcium formate accelerates hydration of tricalcium silicate, but not beyond about 2 percent addition (V. S. Ramachandran: Concrete Admixtures Handbook, 3$^{rd}$ Ed., 1995, p. 257). This is also in accord with V. Dodson (Concrete Admixtures, 1990). Enhancing the reactivity of tricalcium silicate is required to achieve meaningful acceleration. The use of calcium formate as an ASR admixture is not subject to such a limitation. According to A. M. Paillere (Ed., Applications of Admixtures in Concrete, 1995, p. 37), a consensus document produced by a RILEM committee populated by experts on chemical admixtures, calcium formate is sometimes blended with other compounds, such as sodium nitrite, to enhance early strength development. This would never be done if calcium formate were used as an ASR admixture.

Rixom and Mailvaganam teach there to be negligible effect on acceleration when an accelerating admixture contains more than 4 percent of calcium nitrite (R. Rixom and N. Mailvagnam: Chemical Admixtures for Concrete, 3$^{rd}$ Ed., 1999). The use of calcium nitrate as an ASR admixture is not subject to such a limitation.

An additional distinction is that all the accelerating admixtures cited above are calcium salts. None are magnesium salts. Provided the criteria for effectiveness in mitigating ARS cited above are met, the salt interfering with ASR is indifferent to whether Ca or Mg is the cation. This is not the case for accelerating admixture because Mg salts appear not to serve as accelerating admixtures. Additionally, salts which interfere with ASR have the generic formula $Cat^{x+} (An)_x$, where x is an integer of 2 or more, and thus the cation of the salt always has a higher valence than the anion.

The addition of a reduced solubility double salt containing calcium cations and monovalent anions may also interfere with ASR. For example, $Ca(NO_2)_2 \cdot Ca(OH)_2 \cdot xH_2O$ (where x is a whole number ranging from about 0 to 4) may interfere with ASR in proportion to the amount of $Ca(NO_2)_2$ present in the salt. Because the double salt exhibits a lower solubility than $Ca(NO_2)_2$ alone, it would exhibit diminished or negligible effect on acceleration by comparison. However, because the times and modes of action between set acceleration and control of ASR differ, this salt would be effective for control of ASR. A double salt of calcium hydroxide or calcium nitrate or one containing magnesium ions may also be used.

The addition of a mixture containing from about 40 to 60 percent of nitrate ($NO_3$) ions and about 60 to 40 percent of nitrite ($NO_2$) ions may be employed to interfere with ASR. For example, Gaidis (Cem. Concr. Comps. 26: 181-89, 2004) reported a 50-50 mixture of nitrate ($NO_3$) and nitrite ($NO_2$) ions that is produced when $NO_2$ gas is bubbled into an alkaline aqueous medium. Accordingly, the following reaction would occur if the alkaline medium were a calcium hydroxide solution: $2NO_2 + 2OH^-$ [which could be supplied by $2Ca(OH)_2$]$\rightarrow NO_2^-$ and $NO_3^-$ and $H_2O$. Giving explicit consideration to the presence of calcium, the following reaction would occur: $4NO_2 + 2Ca(OH)_2 \rightarrow Ca(NO_2)_{2(aq)}$ and $Ca(NO_3)_{2(aq)} + 2H_2O$. There is no need to subsequently separate the nitrate and nitrite (which is economically advantageous) because they will act in combination as an admixture to control ASR. It does not appear that such a combination has been used either as an accelerator or in the case of calcium nitrite as a corrosion inhibitor.

The present invention is more particularly described in the following non-limiting examples, which are intended to be illustrative only, as numerous modifications and variations therein will be apparent to those skilled in the art.

EXAMPLES

It is understood in the art that a low alkali cement contains less than about 0.6 wt % of $Na_2O$ equivalent. $Na_2O$ equivalent is the total amount of both $Na_2O$ and $K_2O$ present in the cement, reported as $Na_2O$ equivalents. Recognizing that $Na_2O + 2H_2O \rightarrow 2NaOH$, one can calculate the amount of a salt that is required to reduce the effective $Na_2O$ equivalent to the desired value. The following examples illustrate one embodiment of the present invention, in which there is added sufficient salt to bring the effective $Na_2O$ equivalent to this 0.6% value.

Example 1

Assume a cement with an $Na_2O$ equivalent of 1%. To convert this to a low alkali cement, 0.4 wt % of $Na_2O$ needs to be neutralized. Assume a typical mix design called for 5.5 sacks of cement per cubic yard and a water-to-cement ratio of 0.5 by weight. A sack of cement weights 94 pounds. Consequently, the total $Na_2O$ equivalent would be 5.5×94×0.01=5.17 lb. To limit this value to a $Na_2O$ equivalent 0.6% requires neutralization of 0.4×5.17=2.07 lb. If the preferred admixture is $Ca(NO_3)_2$ then on a molar basis, $Na_2O + 2H_2O + Ca(NO_3)_2 \rightarrow Ca(OH)_2 + 2NaNO_3$. Thus, one mole of $Ca(NO_3)_2$ would be required for each mole of $Na_2O$ to be neutralized.

Based on the molecular weights per mole, neutralization of 62 g of $Na_2O$ would require 164 g of $Ca(NO_3)_2$. This ratio is 2.65. Thus, 2.07 lb of $Na_2O$ would require the presence of 5.48 lb of $Ca(NO_3)_2$ per cubic yard of concrete. If the water-to-cement ratio were 0.5, the concrete would be made by mixing the cement with 5.5×94×0.5=258.5 lb of water per cubic yard. Calcium nitrate can be added to this mixing water as crystals that would readily dissolve.

Example 2

An alternative method for reducing hydroxyl ions in concrete is to limit the total alkali content in a cubic yard of concrete. The alkali content in a cubic yard of concrete will increase as the cement content of the concrete increases. The if one mix uses 4.5 sack per cubic yard while another uses 7 sack per cubic yard of the same cement. The alkali content of the 7 sack mix will be 7/4.5=1.56 times higher than that of the 4.5 sack mi. In metric units alkali silica reaction is not considered a problem is the $Na_2O$ equivalent is in the range of 1.8 to 3 kilograms per cubic meter (1.31 cu yard). Assume a typical cement content of 13 weight percent and a typical weight of a cubic meter of concrete to be 2400 kg and a $Na_2O$ equivalent of 1%. Thus the total alkali equivalent will be 2400×0.13×0.01=3.12 kg for the equivalent of a 5.5 sack mix and 4.87 kg for a 7 sack mi. xIn the latter instance a reduction of the content to a maximum of 3 kg per cubic meter would require the addition of sufficient $Ca(NO_3)_2$ to reduce the $Na_2O$ equivalent by 1.87 kg/cubic meter. Again, according to the reaction $Na_2O+2H_2O+Ca(NO_3)_2 \rightarrow Ca(OH)_2+2NaNO_3$, this would require the addition of 4.95 kg of calcium nitrate.

Example 3

Use of a Soluble Organic Salt

Assume a cement with an $Na_2O$ equivalent of 1%. To convert this to a low alkali cement, 0.4 wt % of $Na_2O$ needs to be neutralized. Assume a typical mix design called for 5.5 sacks of cement per cubic yard and a water-to-cement ratio of 0.5 by weight. A sack of cement weights 94 pounds. Consequently, the total $Na_2O$ equivalent would be 5.5×94×0.01=5.17 lb. To limit this value to an $Na_2O$ equivalent 0.6% requires neutralization of 0.4×5.17=2.07 lb. If the preferred admixture is calcium acetate then on a molar basis, $Na_2O+2H_2O+Ca(Ac)_2 \rightarrow Ca(OH)_{2(solid)}+2NaAc$. Thus, one mole of $Ca(Ac)_2$ would be required for each mole of $Na_2O$ to be neutralized.

Based on the molecular weights per mole, neutralization of 62 g of $Na_2O$ would require 158 g of $Ca(Ac)_2$. This weight ratio is 2.55. Thus, 2.07 lb of $Na_2O$ would require the presence of 5.28 lb of $Ca(Ac)_2$ per cubic yard of concrete. If the water-to-cement ratio were 0.5, the concrete would be made by mixing the cement with 5.5×94×0.5=258.5 lb of water per cubic yard. Calcium acetate can be added to this mixing water as crystals that would readily dissolve.

Example 4

Use of a Low Solubility Organic Calcium Salt that Causes Formation of Calcium Hydroxide at a pH Above about 12.6 but Below about 13

Assume a cement with an $Na_2O$ equivalent of 1%. To convert this to a low alkali cement, 0.4 wt % of $Na_2O$ needs to be neutralized. Assume a typical mix design called for 5.5 sacks of cement per cubic yard and a water-to-cement ratio of 0.5 by weight. A sack of cement weights 94 pounds. Consequently, the total $Na_2O$ equivalent would be 5.5×94×0.01=5.17 lb. This amount of alkali will produce a pH high enough to permit ASR to occur. To interfere with ASR particulate calcium oxalate is added to the fresh concrete. To limit the pH to 13 requires the maximum OH content of the pore solution be 0.1 molar. Assume that this requires neutralization of the entirety of $Na_2O$ present. Thus 5.17 lb of $Na_2O$ must be neutralized. This can be accomplished at a pH of 13 according to the following reaction:

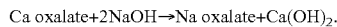

Ca oxalate+2NaOH→Na oxalate+$Ca(OH)_2$.

Thus one mole of calcium oxalate is required for each mole of $Na_2O$ originally present.

Based on the molecular weights per mole, neutralization of 62 g of $Na_2O$ would require 128 g of calcium oxalate. This weight ratio is 2.06. Thus, 5.17 lb of $Na_2O$ would require the presence of 10.67 lb of calcium oxalate per cubic yard of concrete. If the water-to-cement ratio were 0.5, the concrete would be made by mixing the cement with 5.5×94×0.5=258.5 lb of water per cubic yard. Calcium oxalate can be added to this mixing water as crystals.

Example 5

Use of a Free Organic Acid

Assume a cement with an $Na_2O$ equivalent of 1%. To convert this to a low alkali cement, 0.4 wt % of $Na_2O$ needs to be neutralized. Assume a typical mix design called for 5.5 sacks of cement per cubic yard and a water-to-cement ratio of 0.5 by weight. A sack of cement weights 94 pounds. Consequently, the total $Na_2O$ equivalent would be 5.5×94×0.01=5.17 lb. To limit this value to a $Na_2O$ equivalent 0.6% requires neutralization of 0.4×5.17=2.07 lb. If the preferred admixture is oxalic acid then on a molar basis, $Na_2O+2H_2O+HO_2CCO_2H \rightarrow Na_2(COO)_2$. Thus, one mole of oxalic acid would be required for each mole of $Na_2O$ to be neutralized.

Based on the molecular weights per mole, neutralization of 62 g of $Na_2O$ would require 90 g of oxalic acid. This weight ratio is 1.45. Thus, 2.07 lb of $Na_2O$ would require the presence of 3 lb of oxalic acid per cubic yard of concrete. If the water-to-cement ratio were 0.5, the concrete would be made by mixing the cement with 5.5×94×0.5=258.5 lb of water per cubic yard. Oxalic acid can be added to this mixing water as crystals. Alternatively, oxalic acid dehydrate crystals could be added provided the proportions were altered to consider the molecular weight difference.

Example 6A

Use of an Alkoxide

Assume a cement with an $Na_2O$ equivalent of 1%. To convert this to a low alkali cement, 0.4 wt % of $Na_2O$ needs to be neutralized. Assume a typical mix design called for 5.5 sacks of cement per cubic yard and a water-to-cement ratio of 0.5 by weight. A sack of cement weights 94 pounds. Consequently, the total $Na_2O$ equivalent would be 5.5×94×0.01=5.17 lb. To limit this value to an $Na_2O$ equivalent 0.6% requires neutralization of 0.4×5.17=2.07 lb. Tetraethyl oxysilane (TEOS) is a liquid at room temperature which has a limited solubility in water. In the proportions needed it will be soluble with the mixing water used to produce concrete. TEOS liquid will be added to the mixing water and will hydrolyze to produce oligomers of approximate composition $Si_nO_{(2n+1)}H_{(n+2)}$. These will react in turn with Na and hydroxyls to produce $Na_2SiO_3.9H_2O$. Alternatively the TEOS may be partially hydrolyzed before adding it to the mixing water. Thus, 1 mole of $Na_2O$ is consumed per mole of TEOS or per 1 mole of silica if the TEOS is partially hydrolyzed. On a weight ratio basis, 208 g of TEOS are required per 62 g of $Na_2O$. Thus to neutralize 2.07 lb of $Na_2O$ will require 6.94 lb of TEOS. Given a density of TEOS liquid of about 1.4, this will require about 0.5 liter per cubic yard of concrete.

Example 6B

Use of a Lithium Alkoxide to Remediate Existing Concrete

It is known that lithium (Li) interferes with ASR by forming a lithium-containing, alkali-containing gel that is not expansive. The precise composition of this gel is unknown. It is known empirically, however, that spraying an aqueous solution containing a dissolved Li salt, such as lithium nitrate or lithium hydroxide, interferes with ASR, provided the solution enters the concrete pore solution. It is not known how much Li must enter the concrete pore solution to be effective, however, the Li ion contains a large hydration sphere which makes it relatively immobile.

Li in organic form as an alkoxide can be applied to concrete as a spray or in liquid form. This liquid can be diluted with alcohol or with a water-alcohol mixture. This mixture then is applied to concrete and the Li enters the concrete in an organic form. The ability of an alcohol or alcohol-water mixture to migrate into the porosity or concrete has been documented. When such a liquid contains Li in organic form, the Li does not form a hydration sphere that would make its migration difficult. This hydration sphere forms, though, as the Li alkoxide hydrolyzes to a LiOH solution+alcohol in situ within the concrete. Thus, once the Li enters the pore structure its ability to migrate back out as a consequence of the concrete surface being wetted by rain is reduced. Therefore, lithium alkoxide or lithium alkoxide diluted with alcohol or lithium alkoxide diluted with alcohol and water can be sprayed or applied to existing concrete under conditions favoring the movement of this solution into the concrete porosity. This process can be repeated as needed to ensure that sufficient lithium alkoxide has entered the pore structure of the concrete to permit it to interfere with ASR.

Example 7

Use of a Mixture of Alkoxides which Includes Lithium Alkoxide to Remediate Existing Concrete Lithium alkoxide is mixed in proportionate concentrations with TEOS or with hydrolyzed TEOS to produce $Li_xSi_2O_5$ where x is an integer from 0 to 2. This combination is applied to existing concrete and allowed to move through the pore structure of the concrete until it has intruded to a depth where it encounters the concrete pore solution. When this occurs, the rate of further migration is reduced as this mixture then migrates only by diffusion. As the migration occurs, the water available from the concrete pore solution allows hydrolysis to occur with the formation of the lithium silicate glass. This glass over time reacts with alkali hydroxides present in the concrete and in doing so prevents the alkali hydroxides them from participating in the alkali silica reaction.

Example 8

Remediation of Existing Concrete with Appropriate Soluble Salts

The reaction in concrete presently undergoing ASR can be stopped by allowing solution containing calcium nitrate to soak into the concrete. As this occurs, the reaction $2NaOH+2H_2O+Ca(NO_3)_2 \rightarrow Ca(OH)_2+2NaNO_3$ will propagate.

A similar reaction will occur in the event the alkali is potassium. In this case the reaction $2KOH+2H_2O+Ca(NO_3)_2 \rightarrow Ca(OH)_2+2KNO_3$ will propagate. Application to hardened concrete pavements can be accomplished by spraying using equipment equivalent to that used to apply liquid de-icing salts. Application to horizontal or vertical surfaces can be accomplished by saturating porous materials, including but not limited to paper, cloth, or burlap, and placing them in direct contact with the concrete. This recognizes that means to limit the rate of evaporation, such as covering with plastic sheeting, should be employed.

Rather than employing a soft material, such as cloth, paper or burlap, the salts needed to interfere with ASR can be employed by incorporating them into a porous overlay. Such an overlay could be concrete, mortar, or asphaltic material.

In still another embodiment, the present invention provides a method of resisting and/or inhibiting alkali-silica reaction (ASR) in concrete pore solution, comprising applying to runway concrete a mixture of soluble salts, each of said salts comprised of a cation (Cat) and an anion (An), in which the Cat has a higher valence than the An, and in which the Cat-An salt has a solubility in the concrete pore solution that is greater than Cat-OH, such that when the Cat-An salt precipitates out of the concrete pore solution as Cat-OH, the resulting alkali metal-An salt formed remains within the concrete pore solution or has a solubility in the concrete pore solution greater than that of the Cat-An salt. In this embodiment, the mixture of soluble salts can be formulated as a deicer salt mixture in order to depress the freezing point of water as well as to prevent ASR in the concrete pore solution. The deicing salt mixture is able to buffer the concrete pore solution which contains alkali metal cations and hydroxyl ions, so as to reduce hydroxyl ions in the concrete pore solution.

The mixture of soluble salts can be applied to airfield runway concrete either in situ as a deicer salt mixture to depress the freezing point of water as well as to resist or inhibit ASR in the concrete pore solution, or the mixture of soluble salts can be applied to concrete in an aqueous or non-aqueous solution, such as an alcoholic solution to resist or inhibit ASR in the concrete pore solution regardless of the need for deicing. For example, calcium nitrite is soluble in both water and alcohol. In the event that the concrete to be remediated is airfield runway concrete, the mixture of soluble salts or deicing salt mixture will not harm aircraft alloys and will not elevate the pH of the concrete pore solution to above about 13.

Suitable cations for use in the above-described method include, but are not limited to, sodium, potassium, magnesium or calcium. Additionally, the cations of each of the soluble salts can have at least a divalent valence.

Suitable anions for use in the above-described method include, but are not limited to, nitrates, nitrites, acetates, formates and phosphates.

For example, one soluble salt which is suitable for use in this method is a monobasic alkali phosphate, such as $NaH_2PO_4$ or $KH_2PO_4$. Additionally, the cations of each of the soluble salts can have at least a divalent valence.

In the event that the concrete to be remediated is airfield runway concrete the mixture of soluble salts or deicing salt mixture of the present invention will not cause ASR in airfield runway concrete pore solution because these formulations fulfill the following criteria, and thus are commercially relevant: (1) the soluble salts exhibit sufficient solubility in water to act as effective deicing salts, e.g., the solubility of potassium acetate is 253 g/100 cc of water at 0° C.; (2) the soluble salts do not significantly accelerate the corrosion of alloys used in aircraft; (3) the soluble salts will not cause ASR in runway concrete pore solution due to their direct accumulation within the concrete pore structure; and (4) the soluble salts will not cause ASR in runway concrete pore solution because they react with constituents normally present in runway concrete pore solution.

Soluble salts that will not increase the pH of concrete pore solution to the point of initiating ASR are, for example, monobasic alkali phosphates, such as $NaH_2PO_4$ or $KH_2PO_4$. These compounds react in concrete to produce calcium phosphate having a $Ca/PO_4$ ratio of 10:6. The reactions are as follows:

$$10Ca(OH)_2(solid)+6RH_2PO_4.2H_2O(aqueous) \rightarrow Ca_{10}(PO_4)_6(OH)_2(solid)+3R_2HPO_4.2H_2O(aqueous)+18H_2O \quad (1)$$

$$10[CaO.H_2O]+6[R_2O.P_2O_5.2H_2O] \rightarrow 10CaO.3P_2O_5.H_2O+3[2R_2O.P_2O_5.H_2O]+18H_2O \quad (2)$$

The compounds $NaH_2PO_4$ or $KH_2PO_4$ are expressed generically as $R_2O.P_2O_5.2H_2O$, where $R=Na^+$ or $K^+$. Thus, the compound $2R_2O.P_2O_5.H_2O$ is $Na_2HPO_4$ or $K_2HPO_4$.

The methods of the present invention include applying a mixture of these compounds on concrete wherein they exhibit a buffer action due to their solubility in runway concrete pore solution which solubility is high enough to depress the freezing point of water and thus serve as deicing salts. In the event that the concrete to be remediated is airfield runway concrete, the mixture of compounds of the present invention are not harmful to aircraft alloys, they do not elevate the pH of the runway concrete pore solution above about 13, and thus they do not cause ASR in concrete pore solution.

The generic aspect of this embodiment of the present invention is that any hydroxide which is produced must have a low enough solubility which does not permit a solution with a pH above 13 to form. If the solubility of the hydroxide produced is below that of $Ca(OH)_2$, then a calcium salt of the anion will be produced, as follows:

$$Cat^{x+}(An)_x(aqueous)+Ca(OH)_2(solid) \rightarrow Cat(OH)_x(solid)+Ca(An)_2(solid\ or\ aqueous), \quad (3)$$

where $x=$ an integer of 2 or more.

This is shown more particularly using magnesium acetate as the $Cat^{x+}(An)_x$. Magnesium acetate tetrahydrate is highly soluble at 0° C. and exhibits a solubility of 120 g/100 cc. Thus, magnesium acetate reacts with the constituents present in concrete pore solution as follows:

$$Mg(Ac)_2.4H_2O(aqueous)+Ca(OH)_2(solid) \rightarrow Ca(Ac)_2 (aqueous\ or\ solid,\ depending\ on\ its\ amount)+Mg(OH)_2(solid) \quad (4).$$

Such a reaction occurs because $Ca(Ac)_2$ is less soluble than $Mg(Ac)_2$. However, $Mg(OH)_2$ also is less soluble than $Ca(OH)_2$. Thus, in actuality, this is a base exchange reaction as opposed to a reaction that allows the accumulation of hydroxyl ions in the concrete pore solution. Therefore, unlike the reaction occurring with potassium acetate, there is not a significant accumulation of OH ions in the pore solution of the concrete.

Example 9

Deicing Salt Combination Comprised of Potassium Acetate with Calcium Nitrate

Potassium acetate (KAc) was combined with calcium nitrate [$Ca(NO_3)_2.4H_2O$]. When crystals of these salts were broadcast onto ice covering concrete the following solution resulted:

$$2KAc+Ca(NO_3)_2.4H_2O \leftrightarrow Ca(Ac)_2.2H_2O+2KNO_3.$$

The limiting solubility is that of $KNO_3$, $2KNO_3=1.32$ M. Therefore:

$$2(1.32)+3(\tfrac{1}{2}[1.32\ M]) \leftrightarrow 3(\tfrac{1}{2}[1.32\ M])+2(1.32\ M)$$

Total ionic strength of the solution will be 9.24 molar
Maximum freezing point depression=$(-1.86) \times$ Ionic Strength=17° C.

This approach is limited by the solubility of $KNO_3$.

When this solution enters the pore structure of concrete, $Ca(OH)_2$ precipitates and both $\{Ca(NO_3)_2.4H_2O\}$aq and $\{Ca(Ac)_2.2H_2O\}$aq are converted to $NaNO_3$, $KNO_3$, NaAc, and KAc. The relative abundance of the Na and K salts depends on the pore solution chemistry. $KNO_3$ in excess of 1.32 M precipitates. The above reactions do not increase the pH of the pore solution to the point where ASR is likely to occur.

The same results are obtained if the potassium acetate is replaced with sodium acetate, sodium formate or potassium formate and calcium nitrate is replaced with magnesium nitrate.

Example 10

Deicing Salt Combination Comprised of Potassium Acetate with Calcium Nitrite

Potassium acetate (KAc) was combined with calcium nitrite [$Ca(NO_2)_2.4H_2O$]. When crystals of these deicing salts were broadcast onto ice covering concrete the following solution resulted:

$$2KAc+Ca(NO_2)_2.4H_2O \leftrightarrow Ca(Ac)_2.2H_2O+2KNO_2$$

The limiting solubility is that of calcium acetate=1.93 M. Therefore:

$$2(2[1.93\ M])+3(1.93\ M) \leftrightarrow 3(1.93\ M)+2(2[1.93\ M])$$

Total ionic strength=27.02 molar
Maximum freezing point depression=$(-1.86) \times$ Ionic Strength=50° C.

This approach is limited by the solubility of calcium acetate.

When this solution enters concrete, $Ca(OH)_2$ precipitates and both $\{Ca(NO_2)_2.4H_2O\}$aq and $\{Ca(Ac)_2.2H_2O\}$aq are converted to $NaNO_2$, $KNO_2$, NaAc, and KAc. The relative abundance of the Na and K salts depends on the pore solution chemistry. As all of these salts are highly soluble, the only precipitate likely to form is $Ca(OH)_2$. These reactions do not increase the pH of the pore solution to the point where ASR is likely to occur.

The same results are obtained if the potassium acetate is replaced with sodium acetate, sodium formate or potassium formate and calcium nitrite is replaced with magnesium nitrite.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of limiting or reducing alkali-silica reaction (ASR) in Portland cement concrete by neutralizing sodium oxide equivalent ($Na_2O+K_2O$) in said concrete, comprising admixing soluble salt selected from the group consisting of organic soluble salt, inorganic soluble salt and mixtures thereof, with said concrete, said soluble salt comprising at least one cation, said at least one cation being at least divalent, wherein said soluble salt is present in an amount greater than 5% based on weight of Portland cement.

2. The method claim 1, wherein the organic soluble salt is calcium acetate.

3. The method of claim 2, wherein neutralization of one mole of sodium oxide equivalent requires one mole of calcium acetate.

4. The method of claim 1, wherein the organic soluble salt is not harmful to aircraft alloys when used to interfere with ASR in existing runway concrete.

5. A method of limiting or reducing alkali-silica reaction (ASR) in Portland cement concrete by neutralizing sodium oxide equivalent ($Na_2O+K_2O$) in said concrete, comprising admixing soluble salt selected from the group consisting of organic soluble salt, inorganic soluble salt and mixtures thereof with said concrete, said soluble salt comprising at least one cation, said at least one cation being at least divalent, wherein said soluble salt is present in an amount of greater than 5% based on weight of Portland cement, which results in the formation of a hydroxide-containing precipitate at a pH of about 13 or less.

6. The method of claim 5, wherein neutralization of one mole of sodium oxide equivalent requires one mole of calcium oxalate.

7. The method of claim 5, wherein the organic salt is not harmful to aircraft alloys when used to interfere with ASR in existing runway concrete.

8. The method of claim 5, wherein the cation is selected from the group consisting of divalent cations, trivalent cations, quatravalent cations and mixtures thereof.

9. The method of claim 5, wherein the formation of the hydroxide-containing precipitate is at a pH range of about 12.6 to about 13.

10. A method of limiting or reducing alkali-silica reaction (ASR) in Portland cement concrete by neutralizing sodium oxide equivalent ($Na_2O+K_2O$) in said concrete, comprising applying a soluble salt to hardened concrete, said soluble salt selected from the group consisting of organic calcium-containing soluble salts, inorganic calcium-containing soluble salts, organic non-calcium-containing soluble salts, inorganic non-calcium-containing soluble salts, and mixtures thereof, said soluble salt comprising at least one cation, said at least one cation being at least divalent, wherein said soluble salt is present in an amount of greater than 5% based on weight of Portland cement.

* * * * *